United States Patent [19]
Kloosterhouse

[11] Patent Number: 4,962,841
[45] Date of Patent: Oct. 16, 1990

[54] OPPOSITE DIRECTION TRANSFER DEVICE

[75] Inventor: Donald H. Kloosterhouse, Zeeland, Mich.

[73] Assignee: Ermanco Incorporated, Spring Lake, Mich.

[21] Appl. No.: 316,979

[22] Filed: Feb. 28, 1989

[51] Int. Cl.⁵ .............................................. B65G 37/00
[52] U.S. Cl. ....................................... 198/372; 198/809
[58] Field of Search ............... 198/597, 372, 809, 781, 198/790, 817

[56]  References Cited
U.S. PATENT DOCUMENTS

| | | |
|---|---|---|
| 2,778,474 | 1/1957 | De Koning . |
| 2,986,261 | 5/1961 | Wenstrand . |
| 3,104,004 | 9/1963 | Pole et al. . |
| 3,179,234 | 4/1965 | Bloom et al. . |
| 3,592,333 | 7/1971 | Sullivan et al. . |
| 3,621,971 | 11/1971 | Daniels et al. . |
| 3,651,922 | 3/1972 | Ross et al. . |
| 3,679,043 | 7/1972 | Becker . |
| 3,822,777 | 7/1974 | Jepsen . |
| 3,828,917 | 8/1974 | Ostergren . |
| 3,921,789 | 11/1975 | Goldinger et al. . |
| 4,174,774 | 11/1979 | Bourgeois . |
| 4,200,178 | 4/1980 | Gunti ................................. 198/372 |
| 4,256,222 | 3/1981 | Gunti . |
| 4,346,799 | 8/1982 | Dunville et al. . |
| 4,541,520 | 9/1985 | Greenlee, III ...................... 198/372 |
| 4,730,718 | 3/1988 | Fazio et al. . |
| 4,798,275 | 1/1989 | Leemkuil et al. ................... 198/372 |
| 4,819,782 | 4/1989 | Fenner ........................... 198/809 X |

OTHER PUBLICATIONS

Data page from Price Manual of Ermanco Incorporated.

Primary Examiner—H. Grant Skaggs
Assistant Examiner—James R. Bidwell
Attorney, Agent, or Firm—Lockwood, Alex, FitzGibbon & Cummings

[57]  ABSTRACT

An opposite direction transfer device for use in live roller line shaft conveyor sytems is disclosed. The transfer device is driven by the same drive used to power the main conveyor rollers of a live roller, line shaft conveyor system. In the preferred embodiment, the transfer device includes a conveying member in the form of an elastomeric O-belt which is reeved around a set of transfer wheels, a drive shaft, at least two idler wheels, and a slave shaft. The conveying member is driven by the rotating drive shaft and slave shaft to transfer articles from an adjacent conveyor line or work station onto the pass line of the main conveyor system, or vice versa.

15 Claims, 2 Drawing Sheets

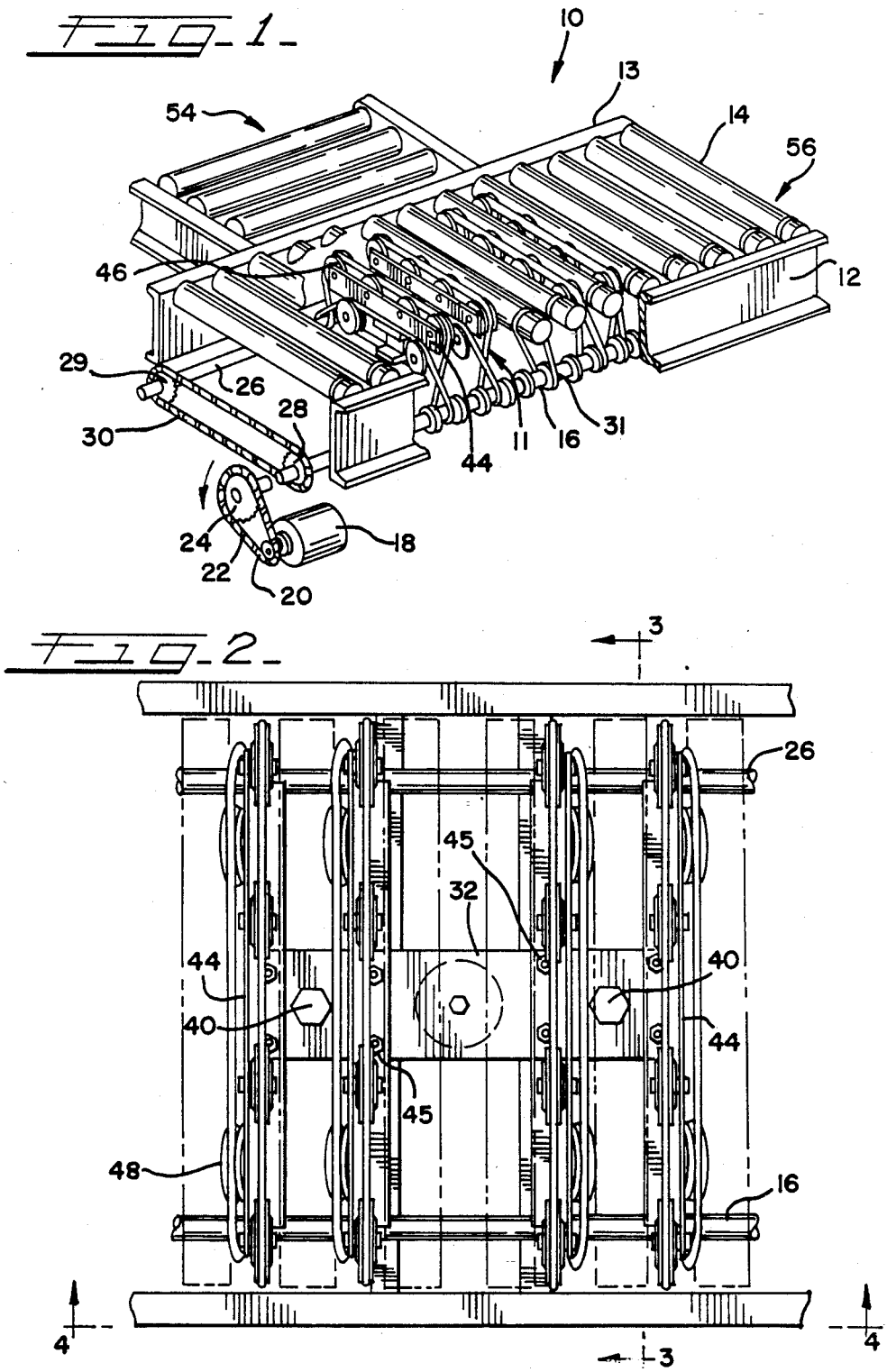

OPPOSITE DIRECTION TRANSFER DEVICE

BACKGROUND AND SUMMARY OF THE INVENTION

This invention generally relates to a transfer mechanism for live roller, line shaft conveyor systems. More specifically, this invention relates to an opposite direction transfer device which is driven by the same drive means used to power the main conveyor rollers of a live roller, line shaft conveyor system and which transfer articles from one conveyor line and onto another such as from a work station or an adjacent conveyor line onto the pass line of the main conveyor system, or vice versa.

Transfer mechanisms for transferring articles from one conveyor pass line to another are generally known in the art. Conventional transfer devices utilize at least one conveying member which is generally supported for rotation transverse to the main pass line of the typical conveyor system. These conveying members may be positioned between the main conveyor rollers to transfer conveyed articles between the main pass line and a second pass line which is positioned normal to the pass line of the main conveyor. In general, many of these prior art devices have required a drive system, including a motor, which is separate from the drive system of the main conveyor rollers and which must be dedicated solely to the operation of the conveying member of the transfer device.

Certain other transfer mechanisms are powered by the same drive shaft and drive motor which are also used to drive the rollers of the main conveyor line. These devices, however, are typically constructed to operate in a "standard" mode wherein all of the conveying members of the mechanism are positioned along a conveyor line for rotation in a single direction transverse to the pass line of the conveyor system. The use of such standard mode transfer mechanisms is limited in that all of the conveying members of the transfer mechanism must rotate in a single, uniform direction. Hence, conveyed articles may be transferred onto a main conveyor from adjacent conveyor lines or work stations when the drive motor is set to rotate the drive shaft and a slave shaft in one rotational direction. These standard mode devices have lacked the versatility required when it is desired to have a live roller, line shaft conveyor system which includes transfer mechanisms thereon, some of which transfer articles onto the main conveyor line, while other transfer mechanisms will simultaneously transfer articles from the main conveyor and onto an adjacent conveyor line or work station.

The present invention overcomes the above-noted problems and disadvantages of the prior art by providing an opposite direction transfer device in which an endless conveying member is driven by the same drive shaft and drive motor which are used to drive the rollers of the main conveyor system. The conveying member is mounted on guide means which are positioned on a vertically displaceable lift table for positioning the conveying member in a raised and operative position or in a lowered and inoperative position. The conveying member is supplied in the form of an endless drive belt or O-belt which is reeved around the guide means of the transfer device and around the drive shaft and the slave shaft of the main conveyor so that the conveying member is driven in a direction transverse to the main pass line and in the opposite direction of a standard mode transfer mechanism to transfer articles either to or from a side location, such as from a second or adjacent conveyor line, for example, and onto the conveyor rollers of the main or first conveyor line. A live roller, line shaft conveyor system which is equipped with both standard mode and opposite direction transfer devices will simultaneously allow conveyed articles to be transferred both onto the main conveyor as well as from the main conveyor to adjacent conveyor lines or work stations.

Means are provided for positioning the lift table of the opposite direction transfer device in either a lowered/inoperative position or in a raised/operative position. In the operative position, the guide means are displaced so that the conveying member is raised slightly above the surface of the pass line of the main conveyor with the conveying member being disposed between and parallel to a pair of main conveyor rollers. In the lowered position, the conveying members are positioned beneath the conveying surface or pass line of the main conveyor. In this arrangement of parts, articles from work stations and conveyor lines adjacent to the main conveyor system may be selectively loaded on to the main pass line by positioning the transfer device in the raised/operative position to pick up the articles from the second or adjacent line and deposit them onto the first or main conveyor line. Conversely, the rotation of the drive shaft may be reversed by reversing the phase of the drive motor to thereby load conveyed articles from the main conveyor line onto an adjacent line or work station.

Accordingly, it is an object of the present invention to provide an opposite direction transfer device for loading articles onto a first or main conveyor line from a second or adjacent conveyor line, and vice versa.

It is another object of the present invention to provide an opposite direction transfer device with a conveying member which is driven by the same drive means used to drive the conveyor rollers of the first or main conveyor line.

It is still another object of the present invention to provide a transfer device having a conveying member which is reeved around guide means mounted on a lift table such that the conveying member is driven in a direction transverse to the pass line of the first or main conveyor line to thereby assist in transferring articles when the transfer device is in a raised/operative position.

BRIEF DESCRIPTION OF THE DRAWINGS

FIG. 1 is a perspective view of a live roller line shaft conveyor system incorporating the transfer device of the present invention, with portions of the main conveyor broken away to better show the invention;

FIG. 2 is a top plan view of the transfer device of FIG. 1 and showing six conveyor rollers of the main conveyor in phantom;

DETAILED DESCRIPTION OF THE INVENTION

Figure 3:
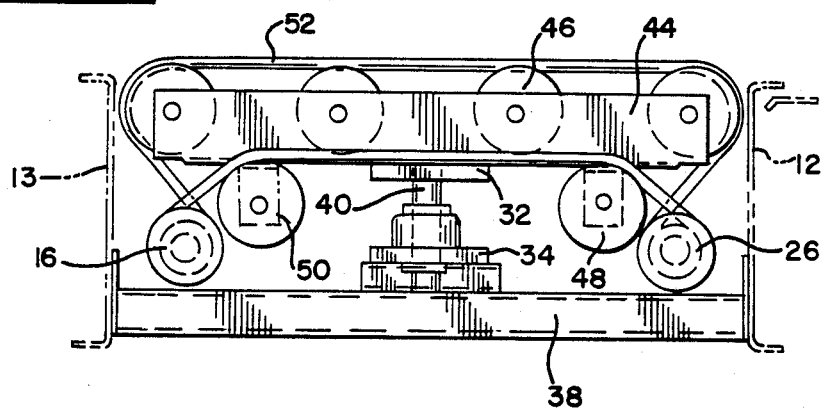
FIG. 3 is a side elevational view of the transfer device of FIG. 2 taken along the 3—3 line thereof.

Referring to the drawings, and particularly to FIG. 1, a live roller line shaft conveyor system 10 incorporating an opposite direction transfer device 11 is shown. As known in the art, the conveyor system 10 includes frame means in the form of parallel frame members 12 and 13. Conveyor rollers 14 are provided and extend between the frame members 12 and 13. The rollers 14 are generally powered by endless belt members 31. In general, each belt 31 is looped around a single conveyor roller 14 and the drive shaft 16.

The drive shaft 16 of the conveyor system 10 is generally positioned beneath the pass line of the rollers in proximate spacial relationship to one of the frame members 12. As shown, the drive shaft is generally positioned parallel to the frame members 12 and 13 and is rotationally driven by a suitable motor 18. In the described embodiment, the motor 18 is connected to the drive shaft 16 in a conventional manner, such as by the chain and sprocket drive depicted in FIG. 1, for example. As depicted, the sprocket 20, mounted on the shaft of motor 18, drives the drive shaft 16 by means of the chain 22 and the sprocket 24 which i mounted at the end of the drive shaft 16. The drive shaft 16 is generally continuous and is supported therealong by conventional shaft bearings (not shown) mounted in spaced apart relation along the inside of the frame member 12. As shown in FIG. 1, a slave shaft 26 is also mounted along the inside of frame member 13 in the same manner that drive shaft 16 is mounted to frame member 12. The slave shaft 26 is rotationally driven by the drive shaft 16 via sprockets 28 and 29 with a chain 30 looped therearound.

Referring generally to FIGS. 1-4, a lift table 32 is mounted on a stationary table support 34. The table 32 is vertically movable over the support 34 which is mounted on parallel cross members 36 and 38. The cross members 36 and 38 extend transversely between and are mounted to the parallel frame members 12 and 13 to provide a support surface for the table support member 34. The guide shafts 40 are affixed to and extend vertically down from the lift table 32. The stationary lift table support member 34 is provided with a pair of bores (not shown) each of which are positioned and dimensioned to slidably receive a guide shaft 40 therein when the table 32 is lowered from its raised position to its lowered position. The lift table 32 is supported for vertical displacement on support member 34 by displacing means such as a pneumatic lift 42, for example. Other means for vertically displacing the lift table 32 can be employed such as, for example, gear systems, cams, hydraulic lifts or the equivalents thereof.

Figure 4:
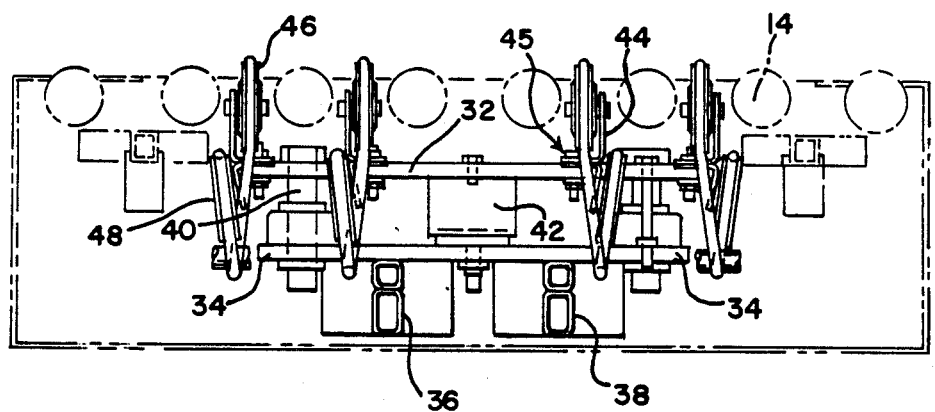
FIG. 4 is front elevational view of the transfer device of FIG. 2, taken along the 4—4 line thereof and showing, in phantom, the conveyor rollers of the main conveyor system.

As shown in FIGS. 2 and 4, each lift table 32 is preferably provided with a plurality of first support brackets 44 which are mounted to the table 32 in parallel spaced apart relationship to each other. Each first support bracket 44 is provided with a set of transfer wheels 46 which are rotatably mounted thereon so that the axes of rotation for all of the transfer wheels 46 lie in a common plane parallel to the pass line of the main conveyor 10. At least two additional idler wheels 48 are positioned below each set of transfer wheels 46 and are mounted on a second support bracket 50 which extend down from a first support bracket 44 and around the ends of lift table 32. The support brackets 44 and 50 can be fastened to the table 32 by a conventional nut and bolt 45 which also secures the brackets 44 and 50 to each other. Idler wheels 48 are mounted beneath the table 32 and on the opposite side of the support brackets 44 and 50 from the transfer wheels 46. Additionally, the support brackets 50 extend down from the table 32 at a slight angle so that the lowermost portion of the idler wheel 48, when mounted, crosses a downwardly extending vertical plane in which the vertical portion of the mounted first support bracket 44 lies. Likewise, the uppermost portion of idler wheel 48 is positioned on the opposite side of the above-mentioned vertical plane so that the position of the idler wheel 48 is slightly angled, as shown in FIG. 4. In the preferred embodiment of the transfer device 11, two idler wheels 48 are provided for each set of four transfer wheels 46. However, those skilled in the art will appreciate that other such combinations of idler wheels and transfer wheels are possible and are contemplated by the present invention.

As mentioned, the table 32 is provided with guide means in the form of a plurality of first support brackets 44 and second support brackets 50 with the associated transfer wheels 46 and idler wheels 48, mounted thereon. As shown, the mounted transfer wheels 46 and idler wheels 48 associated with each first support bracket 44 and each second support bracket 50 interact to carry an endless conveying member or O-belt 52. Preferably, the conveying member 52 is reeved around the transfer wheels 46, the idler wheels 48, the drive shaft 16 and the slave shaft 26 substantially as shown in FIG. 3. In this manner, the transfer wheels 46 are driven by the conveying member 52 to operate the transfer device 11 wherein the conveying member 52 is carried in a direction transverse to the main pass line to either pick up conveyed articles (not shown) from a work station or a second adjacent conveyor line 54 or to distribute the articles from the main pass line to the adjacent line 54 when the transfer device 11 is in the raised and operative position.

Generally, at least four to seven sets of support brackets 44 and 50 may be mounted on each lift table 32 along with the transfer wheels 46, idler wheels 48 and conveying members 52 associated therewith. When heavier items are to be conveyed by the system 10, it is typically advantageous to affix a maximum number of such brackets 44 and 50 to the table 32. In this manner, the associated member of idler wheels 48, transfer wheels 46 and conveying members 52 will be maximized to provide the needed capacity to transfer these heavier articles. If necessary, a plurality of tables 32 may be positioned in a side by side relationship.

When raised, the lift table 32 is supported at a predetermined vertical distance below the conveyor rollers 14 so that the conveying member 52 projects slightly above the uppermost surface of the conveyor rollers 14, substantially as shown in FIGS. 1 and 4. When the transfer device is in its lowered position, the lift table 32 is positioned at a vertical distance below its raised position so that the conveying member 52 and the uppermost portions of the transfer wheels 46 remain below the upper surface of the conveyor rollers 14. Therefore, when the table is lowered, the transfer of articles is prevented.

In operation, the rotation of the drive shaft 16, as previously described, causes the elastomeric O-belts 31 to rotate the conveyor rollers 14. Similarly, the rotation of the drive shaft 16 and slave shaft 26 rotates the conveying members 52 of the transfer device 11 via the frictional contact between the conveying members 52 and the shafts 16 and 26. In this manner, the same drive means used to power the main conveyor rollers 14 are also utilized to power the transfer device 11 of the present invention.

In the embodiment shown in FIG. 1 and described herein, the motor 18 causes sprockets 24 to rotate the drive shaft 16 in a counter-clockwise rotation, as indicated by the arrow in FIG. 1. Similarly, sprocket 29 and slave shaft 26 will also experience counter-clockwise rotation as a consequence of the interrelationship of parts discussed above. Hence, when the conveying member 52 is reeved around the shafts 16 and 26 and the wheels 46 and 48, in the manner depicted and described herein, the counter-clockwise rotation of shafts 16 and 26 will rotate the conveying member 52 in a direction which is transverse to the main pass line 56 and in a "receiving" mode wherein articles from an adjacent or a second conveyor line 54 will be transferred onto the first or main conveyor line 56 by frictional engagement with the rotating conveying member 52. As already mentioned, the motor 18 should also be capable of rotating the drive shaft 16 and the slave shaft 26 in a clockwise rotation. In the interrelationship of parts described above, the clockwise rotation of the shafts 16 and 26 will rotate the conveying members 52 in a "depositing" mode wherein articles from the main conveyor line 56 will be transferred onto an adjacent or second conveyor line 54.

As discussed, idler wheels 48 are mounted in the transfer device 11 at a slight angle below the lift table 32. In this arrangement of parts, the unitary conveying member 52 is more easily and conveniently reeved around the guide means and the drive shaft 16 to thereby minimize any hinderance to the efficient rotation of the conveying member 52. In operation, the shafts 16 and 26 remain in their fixed positions while the lift table 32 is raised and lowered. Therefore, the conveying member 52 must be taut enough to be retained around the guide means and the shafts 16 and 26 when the table 32 is lowered, yet, the member 52 must also be flexible enough to allow the table 32 to be raised by the pneumatic lift 42. Such undue hinderance will occur if the conveying member is overly stiff or inflexible. In this regard, commercially available conveying members made from polyurethane are generally preferred.

While the embodiments of the present invention have been described, it will be appreciated that modifications are possible, as known by those skilled in the art, without departing the from the true spirit and scope of the invention as defined in the following claims.

What is claimed is:

1. An opposite direction transfer device for use with a conveyor system, comprising:
    a frame;
    a lift table mounted for vertical movement on said frame;
    guide means positioned on said lift table for guiding a conveying member thereon, said guide means including a plurality of vertically disposed transfer wheels rotationally mounted on a first support bracket oriented within a vertically extending first plane, said first support bracket being affixed to and extending above said lift table and at least two idler wheels rotatably mounted below said transfer wheels, said idler wheels being mounted on a second support bracket extending down from said lift table, said second support bracket oriented within a second plane, said second plane intersecting said first plane beneath said lift table;
    power means for driving said conveying member, said power means including a drive shaft, said conveying member being reeved around said drive shaft and around said guide means such that rotation of said drive shaft drives said conveying member on said guide means; and,
    positioning means for positioning said lift table in a raised position or in a lowered portion, said positioning means being operatively associated with said lift table;
    whereby, said conveying means transfers articles from a second conveyor to a first conveyor, or vice versa, when said lift table is in said raised position.

2. The transfer device of claim 1 wherein said conveying member is an endless elastomeric belt.

3. The transfer device of claim 2 wherein said conveying member is made from polyurethane.

4. The transfer device of claim 1 wherein said lift table is provided with at least four separate guide means disposed thereon.

5. The device of claim 1 wherein said power means further includes a slave shaft operatively associated with said drive shaft such that rotation of said drive shaft causes said slave shaft to rotate in the same rotational direction as said drive shaft.

6. The device of claim 5 wherein said conveying member is also reeved around said slave shaft.

7. The device of claim 1 wherein said means for positioning said lift table is a pneumatic lift.

8. In a conveyor system which includes a first conveyor line for conveying articles along a first pass line, said first conveyor line including a drive shaft, a second conveyor line for conveying articles along a second pass line, and an opposite direction transfer device operatively associated with said first conveyor line for transferring articles from said second conveyor line to said first conveyor line, and vice versa, the improvement wherein said opposite direction transfer device comprises:
    a frame;
    a lift table mounted for vertical movement on said frame;
    guide means positioned on said lift table for guiding a conveying member thereon, said guide means including a plurality of vertically disposed transfer wheels rotationally mounted on a first support bracket oriented within a vertically extending first plane, said first support bracket being affixed to and extending above said lift table and, at least two idler wheels rotatably mounted below said transfer wheels, said idler wheels being mounted on a second support bracket extending down from said lift table, said second support bracket oriented within a second plane, said second plane intersecting said first plane beneath said lift table;
    power means for driving said conveying member; and
    positioning means for positioning said lift table in a raised position or in a lowered position, said positioning means being operatively associated with said lift table;
    whereby, said conveying means transfers articles from a second conveyor to a first conveyor, or vice versa, when said lift table is in said raised position.

9. The conveyor system of claim 8, wherein said conveying member is an endless elastomeric belt.

10. The conveyor system of claim 9, wherein said conveying member is made from polyurethane.

11. The conveyor system of claim 8, wherein said lift table is provided with at least four separate guide means disposed thereon.

12. The conveyor system of claim 8, wherein said power means includes the drive shaft for said first conveyor line, said conveying member being reeved around said drive shaft and around said guide means such that rotation of said drive shaft drives said conveying member on said guide means.

13. The conveyor system of claim 12, wherein said power means further includes a slave shaft operatively associated with said drive shaft such that rotation of said drive shaft causes said slave shaft to rotate in the same rotational direction as said drive shaft.

14. The conveyor system of claim 13, wherein said conveying member is also reeved around said slave shaft.

15. The conveyor system of claim 8, wherein said means for positioning said lift table is a pneumatic lift.

* * * * *